Nov. 12, 1968    J. D. BERING    3,410,296
VACUUM RELIEF AND VENT VALVE
Filed Sept. 20, 1966    4 Sheets-Sheet 1
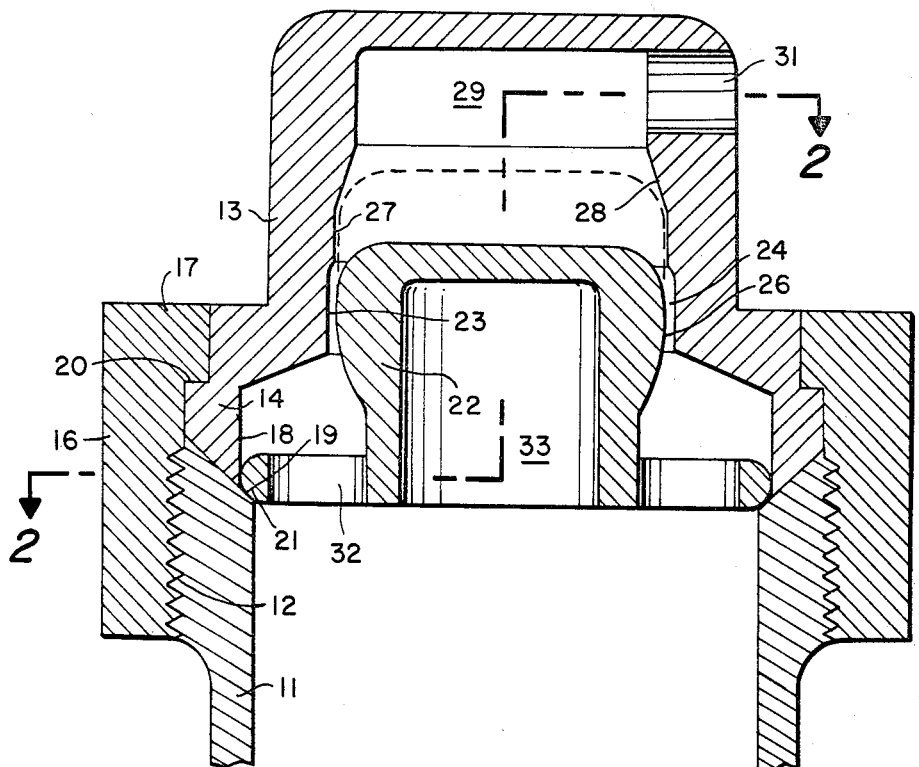
FIG. 1.
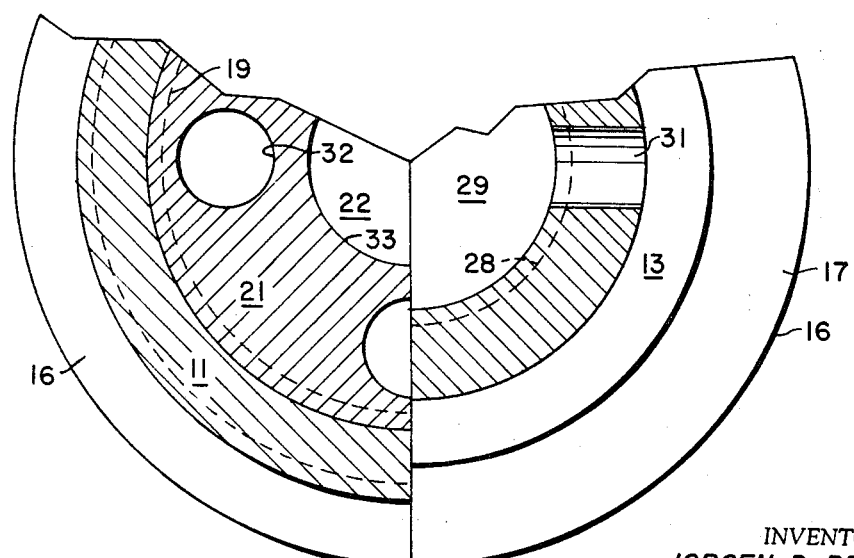
FIG. 2.
INVENTOR.
JORGEN D. BERING
BY
ATTORNEY Nov. 12, 1968   J. D. BERING   3,410,296
VACUUM RELIEF AND VENT VALVE
Filed Sept. 20, 1966   4 Sheets-Sheet 2

INVENTOR.
JORGEN D. BERING
BY
ATTORNEY

Nov. 12, 1968  J. D. BERING  3,410,296
VACUUM RELIEF AND VENT VALVE
Filed Sept. 20, 1966  4 Sheets-Sheet 4

INVENTOR.
JORGEN D. BERING
BY
ATTORNEY

United States Patent Office 3,410,296
Patented Nov. 12, 1968

3,410,296
VACUUM RELIEF AND VENT VALVE
Jorgen D. Bering, Q-Controls, Occidental, Calif. 95465
Filed Sept. 20, 1966, Ser. No. 580,806
5 Claims. (Cl. 137—199)

ABSTRACT OF THE DISCLOSURE

A vacuum relief and vent valve has a hollow body formed with a wide lower chamber communicating with a liquid conduit, a narrower throat, a still narrower seating surface and an upper chamber which has a vent to atmosphere. Reciprocating within the body is a plug having at its widest portion another seating section which, when the valve is open, provides a thin annular passage from said lower chamber past said throat in substantially a straight flow. When the plug is raised to closed position, the seating sections close off liquid flow. The valve closes by action of gravity until liquid flushes the plug into open position by the combined effect of kinetic action of liquid against the plug, friction of the liquid moving through the throat and liquid pressure. At other times the valve is open to permit air to enter and exhaust.

---

Figure 4:
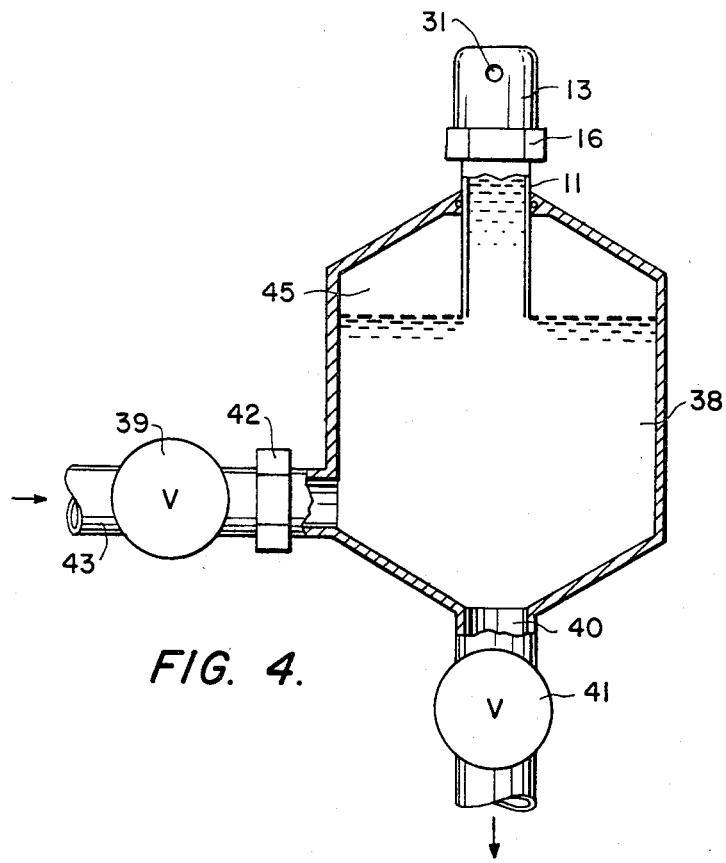

This invention relates to self-actuating regulating valves for liquid systems which allow air passage one way or both ways, but will not allow escape of liquid. Valves of this nature are used for venting air from closed liquid systems, for vacuum relief, syphon prevention, line purging of liquid by air, and whenever valve action distinguishing between air and liquid flow is of importance.

In many usages of this type of valve it is preferable that the valve remain open at atmospheric pressure so that no initial action is required to establish air passage. Initial opening action tends to inject variable factors in the operation of the valve and make the action sluggish to minimal demand and thus less sensitive. Therefore, when desired, the valves of my invention maintain open position at atmospheric pressure, or zero degree of vacuum, with instant closure against liquid pressure.

However, in other usages, such as when used exclusively for venting, it is required that the valve remain closed for air intake at atmospheric pressure, wherefore my invention includes a modification that meets this need.

As to material, it is of importance for rapid and reliable performance to avoid the use of corrosive metals or materials, such as plastics, which tend to deteriorate and change texture in case of combined air and liquid exposure. Entirely stainless steel valves, avoiding even partial usage of other materials, are highly desirable, wherefore my invention takes into consideration the peculiar surface characteristics of stainless steel, particularly the binding or "galling" tendency, and its effect on valve action. For similar reason avoidance of the use of springs during the initial opening action is desirable, and is a feature of my invention.

Very rapid—or relatively "instant"—action is necessary to prevent "spitting" from the valve at the completion of air venting action when the air inside the system has been expelled and the liquid phase closes the valve. Ejection of even a small amount of liquid during closing becomes readily objectionable, especially in sanitary operation. The valves of my invention are specifically designed to prevent such "spitting."

The acute need for rapid and reliable action tends to limit the orifice and thus the air flow through the valve when open and thus its volume capacity for vacuum relief. While the obtainable capacities through the valves of my invention are sufficient in most operations, there are occasions in liquid processing which require both a primary—or initial—rapid vacuum relief action (of limited volume capacity) and a secondary vacuum relief action of large—or massive—capacity. This need occurs in liquid processing systems which include a limited section exposed to vacuum while the rest of the system must be protected against vacuum under all circumstances. My invention includes a dual action modification for this purpose.

Since stainless steel valves are widely used in sanitary operation, an important feature of the valves of my invention is their adaptability to sanitary design and conformity with the various related requirements for quick assembly, easy cleanability, smooth flow and absence of pockets.

Other aspects of my invention will become apparent through the following specification and accompanying drawings.

Figure 3:
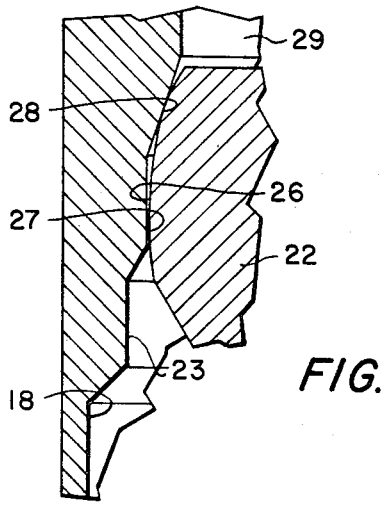
Figure 5:
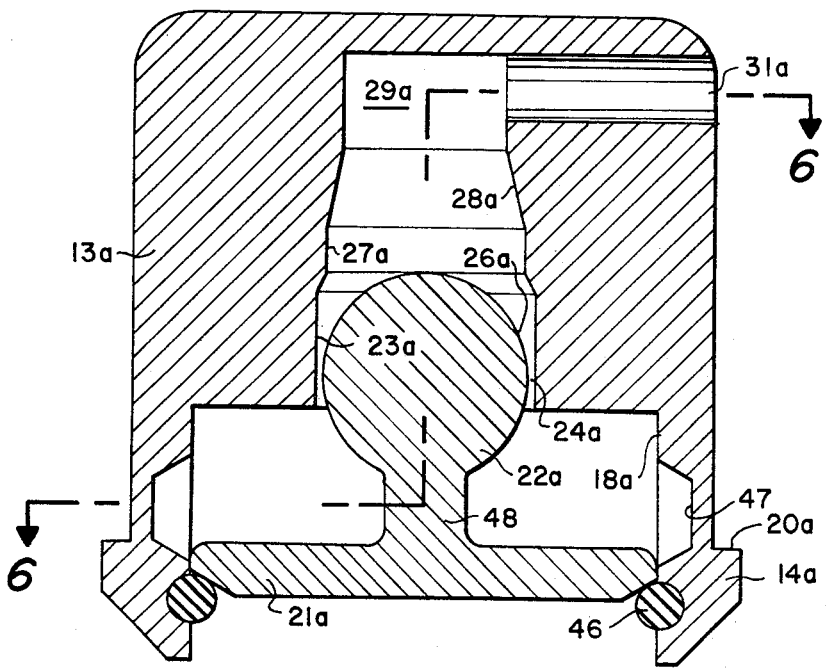
Figure 6:
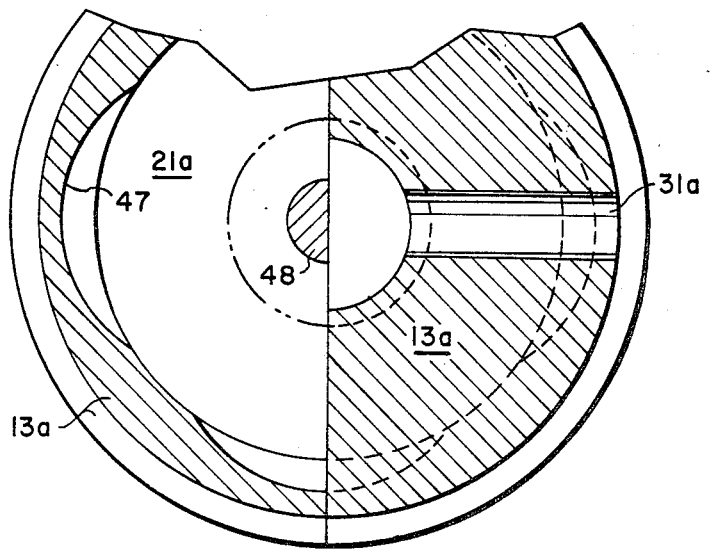
Figure 7:
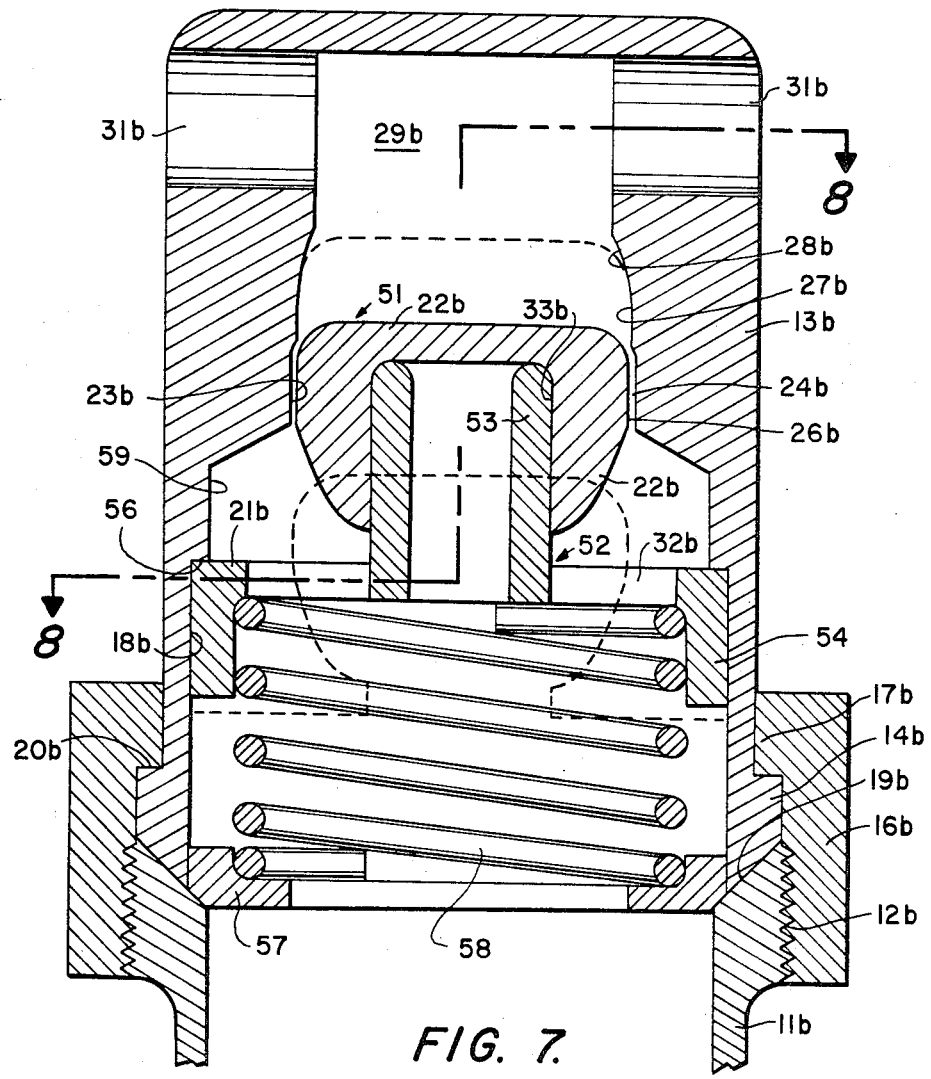
Figure 8:
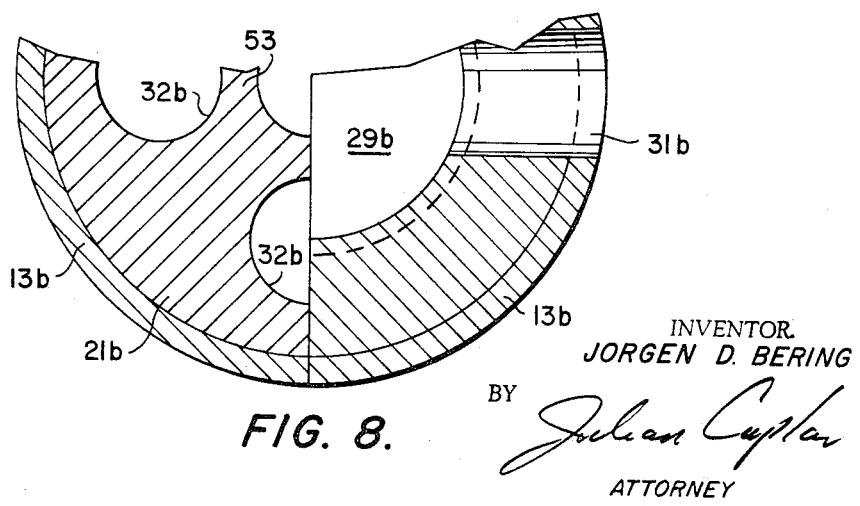

In the drawings:
FIG. 1 is a vertical sectional view through one modification of my valve.
FIG. 2 is a fragmentary sectional view taken substantially along line 2—2 of FIG. 1.
FIG. 3 is an enlarged fragmentary view of a portion of the structure of FIG. 1 showing seating of the valve plug on its seat.
FIG. 4 is a schematic view of a system employing the valve of FIGS. 1 and 2.
FIG. 5 is a view similar to FIG. 1 of another modification.
FIG. 6 is a fragmentary sectional view taken substantially along line 6—6 of FIG. 5.
FIG. 7 is a view similar to FIG. 1 of a further modification.
FIG. 8 is a fragmentary sectional view taken substantially along line 8—8 of FIG. 7.

FIGS. 1 to 4, inclusive, show one modification of the vacuum relief and vent valve which is open at atmospheric pressure and permits air intake and escape but prevents liquid escape. The valve is installed in vertical upward position and is attached by means such as a union to the tubular outlet 11 of a closed liquid system of which that shown in FIG. 4 is an example. Tubular outlet 11 is provided with a threaded part 12 for a standard sanitary union with the exterior of valve body 13 supplying the matching union part 14 which is held in place by nut 16 having inturned flange 17 engaging shoulder 20 on body 13.

The lower end of the interior of the valve body 13 consists of a cylindrical section 18 of an inside diameter slightly larger than the inside diameter of outlet 11, thereby leaving a shoulder 19 on the upper end of outlet 11. Disk 21 of valve plug 22 rests on shoulder 19 in the open position of the valve, but this is only one of various ways to accomplish this object. The length of section 18 determines the stroke of plug 22.

Above cylindrical union part 14 is a reduced diameter throat section 23 which is sufficiently larger than the enlarged external spherical section 26 on the upper end of plug 22 to provide air passage space 24 when the valve is in the open position shown in solid lines in FIG. 1.

If all stainless steel seating is desired the section 23 is provided with an upper further reduced diameter cylindrical section 27 of a diameter making sealing contact with the spherical section 26 of the plug 22. The maximum permissible radial clearance for proper sealing of this nature in stainless steel is about .004". Upwardly the section 27 is followed by the conical section 28 leading to upper chamber 29 of still lesser diameter and formed with outlet opening 31. The sections 27 and 28 are of sufficient length to produce—with the valve in closed position—a dual line seal between the spherical section 26 of the plug 22, namely one along a grand circle of the spherical section 26 and the sector 27, as explained above, and another against the conical body seat section 28.

If materials other than stainless steel are used for seating, or if generally single line seating against the spherical section 26 of plug 22 is judged sufficient, the cylindrical body seating section 27 can be eliminated. If O-ring or similar plastic seating is preferred, a cylindrical section in which a suitable groove for holding the sealing ring is cut is substituted for spherical section 26, and the conical section 28 is eliminated.

When the valve is used for venting or vacuum relief the opening 31 leads to the atmosphere. If air injection for vacuum relief is undesirable, as in case of the processing of foaming liquids, the opening 31 may connect with a liquid reservoir, thus injecting liquid for vacuum relief. If the valve is used for purging liquid from lines with air, the opening 31 may be directly connected with a compressed air supply.

As mentioned, the lower end of the valve plug 22 forms a disk 21 of a diameter sufficiently larger than that of the tubing end 11 so that the plug may rest on the shoulder 19 when the valve is in open position. Other means may be used to hold the plug in proper position. The upper end of the plug includes the spherical section 22 of sufficient diameter to form dual line seating against the body seating sections 27 and 28, as previously described. Alternate forms for seating, such as single line and O-ring seating, have also been mentioned. The over-all length of the plug 22 places the spherical section within the cylindrical body section in the proper position to assure the air passage 24 when the valve is in open position with the plug resting on the shoulder 19.

The total orifice through the openings 32 in disk 21 corresponds to the air passage space 24 around the spherical plug section 26 when the valve is in open position. The optional cavity 33 upward from the bottom of the plug 22 tends to speed up the valve action by reducing the weight of the plug and augmenting the kinetic effect of the liquid as it flushes against the plug.

In operation, the valve remains open as long as the space in the tubular outlet 11 from the system and below the valve is filled with air, and it remains closed when this space is filled with liquid under pressure. The closing action takes place rapidly when the air has been expelled and the liquid flushes the plug 21 into seating position by the combined effect of kinetic action of the liquid against the plug, the friction of the liquid moving through the passage 24, and the liquid pressure. Correspondingly the valve opens by the effect of the weight of the plug and the suction when the pressure within the system falls to atmospheric pressure and below.

Since the valve thus permits both-way air passage (yet blocking liquid escape) it lends itself both to vacuum relief and prevention (by injection of air) and to venting (by ejection of air) of a closed liquid system. The speed and reliability of its action and its volume capacity is largely dependent on the orifice of the air passage 24 which is determined by the diameter of the spherical plug section 26 and its clearance from the body section 23. Other factors are the weight of the plug and its shape in relation to the manner in which the liquid stream is impelled against it, and the length of the stroke of the plug 22 from open (full line) to close (dotted line) positions.

The determination of these factors for effective valve action depends upon operating conditions. As an example, dimensions found suitable for a stainless steel valve relieving vacuum or venting of an operating system of a liquid flow of 100 gallons per minute and using 2" lines and outlet were as follows: 1¼" plug diameter with .020" radial clearance, ¼" stroke and the weight of the plug reduced by a bottom cavity of ¾" diameter and ¾" deep in a 2" diameter disk and opening to the atmosphere.

To assure open position at atmospheric pressure as well as complete venting, the valve must be placed in a topmost position of the liquid system. In upward vertical position the valve is opened by gravity and closed by the flushing action of the liquid overcoming the weight of the plug. Spring action may be used for opening the valve (for instance when the vertical position of the valve is not desired, or when liquid injection is used for vacuum relief) without altering the basic feature of my invention, namely the closing of the valve by the kinetic action of the liquid stream.

FIG. 4 shows use of the vent valve of FIG. 1. Outlet 11 permits the ejection of a predetermined volume of air and thereby functions as a liquid measuring valve. The throw or measured amount is determined by the capacity of the chamber 38. By closing valve 39 chamber 38 can be separated from the rest of the liquid system. Valve body 13 is attached in vertical position by nut 16 to the top-most outlet 11 of the chamber 38, which also has a bottom outlet 40 through which drainage can be controlled by the valve 41.

In "normal open" position, the vent valve is open at atmospheric pressure, the chamber 38 is empty of liquid and the valves 39 and 41 are closed. When valve 39 is opened, liquid under pressure will flow through the line 43 into the chamber 38 until the air capacity of this chamber has been ejected through the vent valve which is then closed by the liquid. After closing valve 39 and opening of valve 41, the vent valve will open and allow air injection as the liquid is drained through the bottom opening 40, after which valve 41 is closed and the vent valve with the chamber 38 returned to "normal open" position, as described above.

The vent valve with the separated chamber 38 thus functions as a quick and compact, single chamber measuring valve capable of drawing a measured volume of liquid directly from the line 43, the only measuring action being the short and rapid movement of the plug in the vent valve, and without need for the various complex arrangements which mechanical measuring devices usually entail, such as surge tanks, pistons and movable seals. For certain usages, it is of particular importance that the measuring arrangement of my invention can be made entirely in stainless steel, with no need for exposure to any other type of material.

It is understood that the valves 39 and 41 can be combined into a three-way valve at the bottom outlet 40 from the chamber 38. By the unions 16 and 42 chambers 38 of various capacity can be readily interchanged. As another means for volume adjustment, the body 13 of the vent valve can be extended in tubular fashion 44 downward into the chamber 38 forming an adjustable air pocket 45, thus reducing the liquid capacity of the chamber, by locking the new movable valve body 13 into final position by the union nut 16 and a suitable sealing and locking ring.

FIG. 5 shows a version of my invention designed for air venting (ejection of air from the system) when vacuum relief or air injection is specifically not wanted. In this version the valve is closed for air intake at vacuum and atmospheric pressure as well as liquid under pressure, and only open for one-way air flow in the form of air ejection under pressure.

The design is the same as that of the valve shown in FIG. 1 excepting the disk 21a of the plug 22a is solid and resting on a lock and sealing ring, such as an O-ring 46, lodged in a groove 47 cut in lower end cylindrical section 18a of the valve body 13a. Several cavities 45 are cut above the groove 47 in the section 18a to permit air passage when the plug disk 21a is lifted partially from resting and sealing position on the ring 46 by the air stream that is being ejected under pressure. Not until liquid flows against the plug 21a will it be flushed into closing position. Plug 22a has a spherical portion 26a elevated above disk 21a by stem 48. In other respects, the modification of FIG. 5 is quite similar to that of FIG. 1 and the same reference numerals, followed by subscript a are used to designate corresponding parts.

FIG. 7 shows a version of my invention in which the upper section is a valve of the same design and function as the valve shown in FIG. 1, rendering rapid vacuum relief at a limited capacity, and to which has been added a lower section capable of additional vacuum relief at a substantially larger volume capacity.

The need for this type of valve is a consequence of the limitations in relief capacity which the suitable dimensions, as previously outlined, for operative valves poses in case of the type of valves shown in FIG. 1.

The upper section 51 of the valve plug 22b in FIG. 7 is similar to that of the plug 22 in FIG. 1 with these exceptions: The lower disk part has been eliminated and for it is substituted base 52 in relation to which upper section 51 is movable by sliding of the walls of the cavity 33b on the exterior of upward tubular section 53 on which the plug 51 rests when the valve is in open position. The base 52 comprises a disk 21b (similar to the disk 21 in FIG. 1) with substantial size openings 32b for air passage, and a downward tubular section 54 which is slidable and guided within the cylindrical section at the bottom of the interior of body 13b.

The cylindrical interior body section 18b is broken with the shoulder 56 which limits the sliding of the base part 21b and thus determines the stroke of base 52. By the several large openings 31b to the atmosphere, the air passage capacity through the valve is increased substantially. Otherwise, the structure of the valve body 13b is similar to that of FIG. 1.

The base part 21b rests—when the valve is wide open for major volume vacuum relief—on lock ring 57 which in turn rests on the shoulder 19b provided by the diameter of the section 18b of the body being larger than the inside diameter of the tubular outlet 11b. Also resting upon lock ring 57 is spring 58 of a tension slightly in excess of the combined weight of sections 51 and 52 when the spring is expanded to lift the disk part 54 against the shoulder 56.

When the valve is "normally open" or at rest at atmospheric pressure and not influenced by any pressure or vacuum condition within the system, the base part 52 is held by the spring 58 against the shoulder 56 holding the plug part 51 resting on the base part 52 in the same position as shown for plug 22 in FIG. 1. If air pressure develops in the system and through the outlet 31b the air will be vented or ejected through the valve which remains in "normal open" position. If the valve becomes exposed to liquid under pressure from the system, the plug 22b will be flushed into closing position by sliding upward over its stroke on the tubular section 53 of the base part 52, and in the manner explained for the valve of FIG. 1. If the pressure inside the system is reduced to atmospheric pressure or below (vacuum) the valve plug 22b drops into open position and permits moderate injection of air into the system, thus rendering vacuum relief at a limited degree of capacity. If the system is exposed to a degree of vacuum action that cannot be relieved through the limited air passage space 24b between the plug section 22b and the body section 13b the unrelieved vacuum action will tend to pull the base part 52 downward against the force of spring 58 thus enlarging the air passage capacity through the valve around the plug section 22b now placed in the wider body section 59, thereby providing secondary vacuum relief action of substantially increased volume capacity. In other respects the structure of FIG. 7 resembles that of the preceding modifications and the same reference numerals followed by subscript b are used to designate corresponding parts.

A feature of the invention is the adaptability of the foregoing structure to stainless steel construction of the plug and at least the seating surface of the body. Stainless steel is, of course, dense and a further important feature is the fact that the dense plug is enabled to float upon the liquid as it is flushed into seating position against the force of gravity. The selection of the relative dimensions shown in the drawings and the density of the steel makes it possible for the friction of the liquid through the throat and its kinetic effect, as well as the displacement of liquid by the plug, to lift the plug the required distance from open to closed position.

Although the foregoing invention has been described in some detail, by way of illustration and example for purposes of clarity of understanding, it is understood that certain changes and modifications may be practiced within the spirit of the invention and scope of the appended claims.

What is claimed is:

1. A regulating valve comprising a hollow body having a lower chamber, a seating zone above said lower chamber of lesser cross-section than said lower chamber and an upper chamber above said seating zone, said upper chamber formed with a vent, a conduit for liquid opening into said lower chamber, a rigid non-buoyant plug having a metallic first seating surface on its exterior, said plug movable inside said body and partially within said lower chamber between open position remote from said seating zone and closed position, cooperating means on said plug and body holding said plug aligned in said lower chamber and limiting movement of said plug beyond open position, said cooperating means comprising a disk in the form of a flange extending radially outwardly on the lower end of said plug and a mating cylindrical surface on the interior of said body, said disk reciprocable as confined by said cylindrical surface, said disk being apertured to permit free flow of fluid between said conduit and said first annular area, said first seating surface being the widest portion of said plug above said cooperating means, said seating zone shaped with a second metallic seating surface mating with said first seating surface to close off liquid flow from said lower chamber to said upper chamber, said seating zone below said second seating surface formed with a throat section of greater cross-section than said second seating surface to permit air flow around said first seating surface when said plug is in open position, said plug and said body shaped and dimensioned to form, when said valve is in open position, a first annular air passage of extensive cross-sectional area between the exterior of said plug and the interior of said lower chamber and a second annular passage of lesser cross-sectional area than said first annular air passage between said first seating surface and said throat, said first and second annular passages extending in a continous substantially straight flow around the exterior of said plug from said conduit into said upper chamber, said plug moving by gravity to open position when said lower chamber is filled with air, said plug moving to closed position when said lower chamber and said plug are flushed with liquid.

2. A valve according to claim 1 in which said disk has an upward extending stem, a knob slidable on said stem toward and away from said disk, said first seating surface formed on said knob, said body formed with a shoulder, resilient means biasing said disk against said shoulder, said disk movable below said shoulder against the force of said resilient means to full-open position, said body shaped so that when said plug is in full-open position air flow from said upper chamber to said conduit is substantially greater than when said disk is against said shoulder.

3. A valve according to claim 1 in which said second seating surface has an upper conical portion and a lower cylindrical portion, said plug when in closed position having its first section surface tangent both to said conical and cylindrical portions, said seating zone and first seating surface of stainless steel.

4. A measuring system comprising a tank, a valve according to claim 1, said first-mentioned conduit communicating with the top of said tank, a second conduit leading into said tank, a third conduit draining said tank, and valve means controlling liquid flow through said second and third conduits.

5. A system according to claim 4 in which said first-mentioned conduit is movable into said tank to adjust the measuring capacity of said tank in said system.

References Cited

UNITED STATES PATENTS

| | | | |
|---|---|---|---|
| 1,656,124 | 1/1928 | Melotte | 137—198 |
| 2,734,522 | 2/1956 | Waltman | 137—197 |
| 2,902,044 | 9/1959 | Sherer | 137—519 X |
| 2,902,250 | 9/1959 | Bering | 251—186 X |
| 2,908,282 | 10/1959 | Maisch | 137—199 |
| 2,926,685 | 3/1960 | Schmaus | 137—202 |
| 3,121,444 | 2/1964 | Bering | 251—333 X |
| 2,362,724 | 11/1944 | Shea | 137—197 X |

ALAN COHAN, *Primary Examiner.*